(12) United States Patent
Hopdjanian et al.

(10) Patent No.: US 8,757,542 B2
(45) Date of Patent: Jun. 24, 2014

(54) ELECTRICAL ARCHITECTURE FOR A ROTARY WING AIRCRAFT WITH A HYBRID POWER PLANT

(75) Inventors: Marie-Laure Hopdjanian, Marseilles (FR); Matthieu Connaulte, Puyricard (FR); Marc Gazzino, Marseilles (FR); Christian Mercier, La Fare les Oliviers (FR)

(73) Assignee: Airbus Helicopters, Marignane Cedex (FR)

( * ) Notice: Subject to any disclaimer, the term of this patent is extended or adjusted under 35 U.S.C. 154(b) by 425 days.

(21) Appl. No.: 13/176,846

(22) Filed: Jul. 6, 2011

(65) Prior Publication Data

US 2012/0025032 A1 Feb. 2, 2012

(30) Foreign Application Priority Data

Jul. 8, 2010 (FR) ...................................... 10 02867

(51) Int. Cl.
*B64D 35/00* (2006.01)
(52) U.S. Cl.
USPC ............... 244/53 R; 244/58; 244/60; 903/915
(58) Field of Classification Search
USPC .................. 244/53 A, 53 R, 17.11, 58, 60, 2; 903/915
See application file for complete search history.

(56) References Cited

U.S. PATENT DOCUMENTS

| 3,455,182 | A | * | 7/1969 | Kelley | 244/58 |
|---|---|---|---|---|---|
| 4,380,725 | A | | 4/1983 | Sherman | |
| 4,702,437 | A | * | 10/1987 | Stearns, Jr. | 244/17.11 |
| 5,203,520 | A | * | 4/1993 | Przygodzki et al. | 244/2 |
| 8,336,814 | B2 | * | 12/2012 | Reinhardt | 244/55 |
| 2002/0079149 | A1 | * | 6/2002 | Kotre et al. | 180/65.3 |
| 2007/0257558 | A1 | | 11/2007 | Berenger | |
| 2009/0018716 | A1 | * | 1/2009 | Ambrosio | 701/22 |
| 2009/0095549 | A1 | * | 4/2009 | Dalum et al. | 180/65.265 |
| 2009/0118917 | A1 | * | 5/2009 | Sah et al. | 701/54 |
| 2009/0140095 | A1 | | 6/2009 | Sirohi | |
| 2009/0145998 | A1 | | 6/2009 | Salyer | |
| 2010/0064689 | A1 | * | 3/2010 | Reinhardt | 60/706 |
| 2011/0121127 | A1 | * | 5/2011 | Certain | 244/17.19 |
| 2012/0068006 | A1 | * | 3/2012 | Jones | 244/17.15 |
| 2013/0119185 | A1 | * | 5/2013 | Botti et al. | 244/17.21 |

FOREIGN PATENT DOCUMENTS

| DE | 102007017332 A1 | 10/2008 |
|---|---|---|
| DE | 102008014404 A1 | 10/2009 |
| FR | 2526380 A1 | 11/1983 |

(Continued)

OTHER PUBLICATIONS

Search Report and Written Opinion; Application No. 1002867; dated Feb. 17, 2011.

*Primary Examiner* — Tien Dinh
*Assistant Examiner* — Marc Burgess
(74) *Attorney, Agent, or Firm* — Brooks Kushman P.C.

(57) ABSTRACT

A hybrid power plant (5) for an aircraft (1) comprises at least: a hybrid drive system (37) having a main on-board electricity network (16) and an auxiliary electricity network (34); and a selective adaptation interface (38) arranged to enable electrical energy to be exchanged selectively between the main and auxiliary electricity networks (16; 34). At least one engine and a hybrid drive auxiliary electrical machine (7, 31) are mechanically connected to a transmission (8); said machine (7) being electrically connected to at least one auxiliary electrical bus (36) in parallel with at least one auxiliary device for delivering electric charge.

26 Claims, 5 Drawing Sheets

(56) References Cited

FOREIGN PATENT DOCUMENTS

| FR | 2909233 | A1 | 5/2005 |
| FR | 2916418 | A1 | 11/2008 |
| FR | 2916419 | A1 | 11/2008 |
| FR | 2916420 | A1 | 11/2008 |
| FR | 2929243 | A1 | 10/2009 |
| FR | 2952907 | A1 | 5/2011 |

* cited by examiner

ELECTRICAL ARCHITECTURE FOR A ROTARY WING AIRCRAFT WITH A HYBRID POWER PLANT

CROSS REFERENCE TO RELATED APPLICATIONS

This application claims the benefit of FR 10 02867 filed on Jul. 8, 2010, the disclosure of which is incorporated in its entirety by reference herein.

BACKGROUND OF THE INVENTION (1) Field of the Invention

The invention relates to the field of rotary wing aircraft (e.g. helicopters, rotorcraft, etc.). It relates more particularly to so-called "hybrid" modes of driving the rotation of at least one rotor via a gearbox of the aircraft.

(2) Description of Related Art

As in the automobile field, a power plant is said herein to be "hybrid" when it is possible to obtain mechanical power by selecting between a combustion source, an electrical source, or both sources together.

Although in practice no hybrid helicopters are presently being mass-produced, numerous types of rotary wing aircraft may be concerned by the invention.

A rotary wing aircraft of the invention may include one or more lift rotors referred to as "main" rotors and/or one or more auxiliary rotors.

The term "auxiliary" rotor is used, for example, to designate antitorque rotors (often tail rotors), or propulsion rotors as in a lateral arrangement of propellers on a long-range high-speed helicopter (e.g. see the documents mentioned below).

In most rotary wing aircraft, a rotor is driven via a gearbox. For example, a lift rotor is often driven via a main gearbox (MGB). Certain auxiliary rotors, such as an antitorque rotor, are generally driven by means of a tail gearbox (TGB).

Various known documents are mentioned below.

Documents relating to laterally-arranged propulsion rotors for long-range high-speed helicopters are the following: FR 2 929 243; FR 2 916 418; FR 2 916 419; and FR 2 916 420.

Document US 2009/0145998 describes a vehicle that incorporates gas-turbine and electrical hybrid propulsion. Its FIGS. 2A or 2B show an application to a helicopter. That document does not describe an aircraft in which a combustion engine is coupled mechanically via a transmission to a rotor and where two electricity networks are connected together via a selective adaptation interface.

Document DE 102008014404 describes a hybrid-drive aircraft, e.g. a helicopter drone. A turbine drives a generator and its electricity powers an electric motor and/or charges batteries. The electric motor is caused to operate with electricity from the batteries in an emergency in the event of the turbine failing.

Document U.S. Pat. No. 4,380,725 describes a direct current (DC) power supply from batteries, which power supply includes a plurality of subsystems, each of which includes a temperature sensor. A BTC connector connects together two link buses of the subsystems. The output voltage from each generator is regulated as a function of temperature rises measured by the sensors.

Furthermore, document US 2009/140095, which describes drive via a gearbox, differs from the invention by arrangements in which an electric motor on its own drives a main rotor in all situations, and is incorporated directly in the rotary mast of the rotor.

French patent application No. 09/05678 (now published as FR 2 952 907) describes a rotary wing aircraft having "hybrid drive modes", e.g. a hybrid power plant implemented on a helicopter. In order to assist or replace drive produced by a combustion engine, that hybrid helicopter power plant includes an electric motor mechanically connected like the combustion engine to the gearbox in order to drive a rotor.

That electric motor is conventionally a brushless motor dimensioned as a function of the first maximum power to be delivered. Furthermore, that electric motor is capable of operating in generator mode and, where necessary, can be used as a brake for the gearboxes. Means for disconnecting the main batteries can be actuated by the pilot in order to activate or stop the electric motors. Those motors, a set of batteries, and a regulator member are independent of the other equipment of the helicopter, in particular its engine and its electricity network.

According to that invention, modes for driving one or more rotors in rotation are of the "hybrid" type in that they associate one or more combustion engine(s) (e.g. a turboshaft engine and/or a piston engine, e.g. a diesel engine) with one or more electrical machines for providing drive. It should be emphasized that such combustion engines and electrical machines are respectively engaged with a transmission (main gearbox (MGB), tail gearbox (TGB), etc.), the transmission being between them and the rotor. In other words, the drive makes use of one or more mechanical drive systems referred to generically as "transmissions".

In order to illustrate that which is referred to as an "electrical architecture", mention is made of document FR 2 526 380, which describes producing and delivering electricity for a helicopter, and in particular it describes what may be referred to as an "electrical master box". In that document, primary contactors and circuit breakers are arranged between the master box, relay boxes, electronic cabinets, and (analog and/or digital) control panels. The master box forms a central unit that also groups together various protection or safety devices.

Other documents are mentioned by way of technological background.

The Document DE 102008014404 describes a helicopter drone that possesses a turbine-driven generator suitable for producing electricity that is delivered to a motor or to batteries for powering said motor. That document describes what might be referred to as a series (or serial) hybrid architecture, i.e. a combustion engine delivering power to rotors via a generator and then, in series, an electric motor. A battery is interposed as a buffer.

Document FR 2 909 233 is an example of an electric starter suitable for operating in synchronous generator mode in a rotorcraft in order to mitigate the fact that an engine is generally overdimensioned. One or more electric motors are engaged with a gearbox and can be used as substitutes for the starter in generator mode. In addition, the electric motors are used to power the low-voltage energy reserve and on-board equipment, via a low-voltage on-board electricity network.

Document US 2009145998 describes (in particular in its FIG. 8B) a two-rotor aircraft having turbines that constitute a first source of drive power. Coupling to one or even three alternating current (AC) electric motors is possible. A clutch is interposed so that the turbine power plant and an electricity generator that is distinct from the electric motors can be selectively engaged or disengaged.

That said, various problems on which the invention is based are explained.

One of these problems stems from the practical difficulty of being able to propose an electrical architecture that is light in weight, reliable, and suitable for hybrid drive, on numerous aircraft models. This should be possible without complicating or increasing the weight of the surrounding electrical architecture (when adding hybrid drive).

This is that much more difficult when for a given aircraft it is desired that hybrid drive should be available as an option. It would then be desirable for the architecture to be completely modular.

Such a variety of configurations thus reduces options for making architectures and their components more uniform between models of a given range of aircraft and between different ranges from the same manufacturer.

According to the invention, "segregation" is made possible between the main electricity network and the auxiliary electricity network used for hybrid drive, the design of the associated electrical architectures thus being greatly simplified and the aircraft potentially being made lighter in overall weight for given mission profile.

It is also appropriate for a suitable quantity of energy to be available on board the aircraft at the required moments and in renewable manner. However, technological, economic, and environment constraints (weight, safety, regulations, . . . ) may conflict with having any guarantee of the electrical architecture being capable of providing the necessary energy distribution and recharging.

All of those problems are made more critical when the aircraft needs to incorporate additional functions that consume large amounts of energy, such as de-icing, winching, ventilation, and air conditioning.

Nevertheless, it is appropriate to avoid overloading the gas generator of its turbine engine when such a member is coupled to the main drive system.

For given overall mission profile, it would also be desirable to be able to achieve energy savings, in particular because of ecological implications and new regulations.

In another register, it is known that certain territories have restricting regulations concerning overflight by single-engined rotary wing aircraft. According to known documents, electrical architectures for power plants (single main engine and auxiliary motor) are interdependent and therefore provide no solution that is acceptable in practice in this field.

Another problem is associated with the fact that demand is increasing for additional and sophisticated items of on-board equipment (de-icing, winching, fans, air conditioning, etc.). The on-board weight of an aircraft is thus tending to increase, and this can even happen during its lifetime. From this point of view, in spite of equipment being optimized, the draconian steps taken to reduce weight can, in practice, constitute an obstacle to providing hybrid drive.

A fortiori, adding hybrid drive as an option or as standard (including functional structures that may represent a weight of the order of several tens of kilograms, i.e. more than the weight of all of the other electricity generator structures), is contradictory and may even be impossible if a model of aircraft is already close to its authorized weight limit.

In conclusion, it can be understood that it is not easy to design, adapt, and produce a hybrid power plant and its architecture so as to have an impact that is favorable in terms of performance (in particular for a multi-engined aircraft such as a twin-engined aircraft), or in terms of safety (in particular for an aircraft having a single engine).

The invention seeks to solve these various problems in particular.

SUMMARY OF THE INVENTION

To this end, the invention provides a rotary wing aircraft having an on-board electricity network and at least: a power plant with a rotor for driving in rotation, at least one transmission, and at least one engine for driving said rotor in rotation via said transmission.

At least one power plant of the aircraft is hybrid, and associates a "main" engine with at least one hybrid drive auxiliary electrical machine. The main engine and the auxiliary electrical machine are mechanically coupled to the transmission of said hybrid power plant.

The auxiliary electrical machine is arranged as an electricity generator and is placed within a hybrid power plant so as to constitute in turn a member for mechanically driving the transmission or a member for generating electricity under the effect of being driven mechanically by said transmission.

The on-board electricity network possesses at least one main electrical bus at a main nominal voltage. The main electrical bus has connected thereto at least one main device for delivering electric charge and including at least one main storage battery, and an electrical machine constituting a starter that is reversibly operable as a generator, said electrical machine that forms a starter being mechanically connected to said engine.

According to a characteristic, the hybrid power plant of the aircraft includes at least one hybrid drive system with at least one auxiliary electricity network for providing hybrid drive, which network possesses at least one dedicated auxiliary electrical bus at an auxiliary nominal voltage. The main electrical bus and the hybrid drive auxiliary electrical bus are connected together via at least one selective adaptation interface, such that the main on-board electricity network and the auxiliary electricity network are electrically distinguishable.

According to a characteristic, the electrical machine forming a starter is electrically connected to the main electricity network via disconnection means of a "main" electric charge-delivery device within the main electricity network.

The auxiliary electrical bus has electrically connected thereto firstly a monitoring and control module together with said auxiliary motor, and secondly at least one selected adaptation interface arranged, by selective connection to the main electricity network, to make it possible selectively to exchange electrical energy between the main and auxiliary electricity networks.

Besides, the auxiliary electrical machine that is mechanically connected to the transmission is electrically connected to the auxiliary electrical bus in parallel with at least one "auxiliary" device for delivering electric charge; the auxiliary charge-delivery device, the monitoring module, the auxiliary electrical machine, the auxiliary electricity network, and the selective adaptation interface forming portions of the hybrid drive system.

According to a characteristic, the power plant includes a single main gearbox (MGB) mechanically connected to at least one lift rotor of the aircraft and to a single engine such as a turboshaft engine or a diesel engine; at least one auxiliary electrical machine being connected to said gearbox.

According to another characteristic, the power plant includes a single main gearbox (MGB) that is mechanically connected to at least one lift rotor of the aircraft and to a plurality of engines, such as two turboshaft engines or two diesel engines; at least one auxiliary electrical machine being connected to said gearbox.

According to another characteristic, the power plant includes a single main gearbox (MGB), with at least two auxiliary electrical machines being directly connected to said gearbox.

According to a characteristic, the power plant includes at least one auxiliary gearbox (AGB) mechanically connected to at least one auxiliary rotor such as one or more tail rotors and/or one or more propulsion rotors of at least one lateral arrangement of propellers for a long-range high-speed rotary wing aircraft; at least one auxiliary electrical machine being connected to said gearbox.

In another embodiment, at least one splitting contactor is arranged in the hybrid drive system between two main buses and/or two auxiliary buses.

In another embodiment, the on-board electricity network is at a main nominal voltage and/or presents a phase type that is/are distinct respectively from an auxiliary nominal voltage and/or an auxiliary phase type (DC, single-phase, two-phase, or three-phase AC) of the auxiliary electricity network; in which case the selective adaptation interface for exchanging energy between the main and auxiliary electricity networks includes at least one phase converter.

In an embodiment, in which the nominal voltage and/or phase type are distinct between the main and auxiliary electricity networks, at least one phase converter of the selective exchange adaptation interface is reversible between an energy exchange direction in which electricity is delivered to the main electricity network and an energy exchange direction in which electricity is delivered to the auxiliary electricity network.

In an embodiment at least one auxiliary storage battery is of the electrochemical and/or capacitive and/or kinetic energy type within at least one main and/or auxiliary charge-delivery device.

According to a characteristic, the hybrid drive system is said to be a multichannel system and includes at least two auxiliary electrical machines, each having in common at least one auxiliary charge-delivery device and/or a monitoring module and/or a selective adaptation interface.

In another embodiment, the hybrid drive system is a multichannel system and includes at least two auxiliary electrical machines, each channel having at least one auxiliary device for delivering electric charge and/or a monitoring module and/or a selective adaptation interface specific thereto.

According to a characteristic, the hybrid power plant comprises at least one main engine in the form of a turboshaft engine coupled to an electrical machine forming a starter that is reversibly operable as a generator, at low voltage and mechanically engaged with the turboshaft engine and placed in a low-voltage main electricity network; a hybrid drive system including at least one auxiliary electrical machine in the form of an electric motor/generator at high voltage, said auxiliary electric motor being a DC machine, mechanically engaged with the transmission and being placed in the high voltage auxiliary electricity network of said hybrid drive system.

According to a characteristic, the hybrid power plant includes electronic means for controlling operation of the main engine(s) and/or of the auxiliary electrical machines, which means are in communication with at least one manual control desk and/or flight controller of the hybrid power plant, the control desk and/or the controller thus being connected to and powered by the main electricity network.

According to a characteristic, the hybrid power plant includes electronic means for monitoring the state and the operation of the main engine(s) and/or of the auxiliary electrical machine(s), these electronic monitoring means being connected to and powered by the main electricity network.

In an embodiment, the electronic monitoring means are in communication with means providing information about the state and the operation of the main engine(s) and/or of the auxiliary electrical machine(s), said monitoring electrical machines being connected to and powered by the main electricity network.

According to a characteristic, the aircraft includes an auxiliary power unit (APU) with an auxiliary generator; said auxiliary power unit is mechanically connected to said transmission of the hybrid power plant in such a manner as to be connected to and to deliver electricity to the on-board electricity network and/or to the auxiliary electricity network in certain stages of flight.

In an embodiment, the electronic monitoring means are associated with measurement, analysis, and storage means that include at least one of the following components:
- a voltage sensor for sensing the voltage of at least one of the main electricity network and/or the auxiliary electricity network, said voltage sensor being associated with comparator means for comparing the sensed voltage(s) with at least one setpoint voltage;
- a current sensor for sensing the current in at least one of the main electricity network and/or the auxiliary electricity network, said current sensor being associated with comparator means for comparing the sensed current(s) and at least one setpoint current;
- a temperature sensor for sensing the temperature of at least one of the main electricity network and/or the auxiliary electricity network, the temperature sensor being associated with comparator means for comparing the sensed temperature(s) and at least one setpoint temperature;
- analyzer means for analyzing the level of charge in at least one charge-delivery device of the main and/or auxiliary on-board electricity network;
- a speed sensor for sensing the speed of rotation of at least one of the engine(s) and/or the electrical machine(s), and/or the transmission; and
- a counter for counting the number of recharging and discharging cycles of at least one charge-delivery device of the main and/or auxiliary on-board electricity network, said cycle counter being associated with analyzer means for analyzing the lifetime of the charge-delivery device(s).

According to a characteristic, the hybrid drive system includes at least one kinetic energy recovery system (KERS) that is mechanically connected to at least one auxiliary electrical machine for recovering a fraction of the kinetic energy generated when it decelerates, and electrically connected to the auxiliary electricity network so as to be capable of powering said auxiliary electrical machine in return, when necessary.

In a power plant provided with a kinetic energy recovery system, a speed sensor is coupled to said system so as to determine its instantaneous speed of rotation, for example incorporated in the measurement, analysis, and storage means.

The invention also provides a method of operating an aircraft as mentioned above. The method provides:
- in an engine-starting stage, initiating starting from at least one electrical machine forming a starter, which is then powered via the auxiliary electricity network;
- in a flight stage, driving the transmission via said engine in a mode of self-sustained operation; and
- in a flight stage and in order to deliver extra mechanical energy occasionally to the transmission, driving the transmission from the auxiliary electrical machine operating as a motor powered by at least one device for delivering electric charge of the main electricity network, in addition to the drive delivered to the transmission by the engine, for the purpose of performing specific flight controls and/or of taking the place of the drive delivered to the transmission by said engine in the event of the engine failing.

In an implementation of the invention, provision is made to power the main electricity network and/or the on-board electricity network from the auxiliary electricity network via the selective adaptation interface in order, where appropriate:

to counter any potential failure of at least one of the following: the electric charge-delivery device of the main electricity network and/or a reversible electrical machine; and/or to reduce the load on the engine when driving the reversible electrical machine.

According to another implementation of the method, provision is made during an engine-starting stage to act as follows:

drive the transmission by the electrical machine forming an auxiliary motor at a setpoint speed that is faster than the speed then allocated to driving the engine by the electrical machine that forms a reversible electric starter, in order to decouple the engine from said transmission;

cause the engine to idle in a mode of self-sustained operation of the engine (i.e. main engine); and couple the engine with the transmission by docking by progressively accelerating the engine to a speed that corresponds to the speed at which the freewheel transmission is being driven by the auxiliary electrical machine, via a freewheel or the like. It should be observed that it is this freewheel between the engine and the transmission that enables them to be decoupled.

In another implementation of the method, provision is made:

in a stage of flight or on the ground, to take mechanical energy from the transmission by the auxiliary electric machine that forms a generator in order to brake said rotor connected to the transmission.

In yet another implementation of the method, provision is made for duplicated operation with replicated power feed of the auxiliary devices for delivering electric charge, e.g. in order to make the electrical drive redundant and for example to make it compatible in any territories with instrument flying regulations (IFR).

In certain embodiments, display means responding to data provided by the measurement, analysis, and storage means provide information (for the crew of the aircraft) relating to the length of time the hybrid drive electrical machine can continue to be operated at maximum power. This length of time is taken into account from an instantaneous state of loading on said electrical machine and from the first power that said machine is itself capable of delivering at a given instant. For example, this first power is a maximum power.

As explained below, in order to provide solutions to the various problems mentioned, the architecture of the invention is an architecture that is said to be electrically "segregated", between a main electricity network dedicated to the engine, and an auxiliary (or subsidiary or ancillary) electricity network dedicated to the hybrid drive, i.e. electric drive.

In particular, the invention makes it possible to share selected resources, and to make functions available on various types of rotary wing aircraft (e.g. lightweight aircraft) that until now have not been accessible, and also to make it possible more effectively to lighten the load on the engine (e.g. the gas generator, and consequently the starter/generator), thereby achieving overall energy consumption savings. The ecological impact of the invention is considerable.

BRIEF DESCRIPTION OF THE DRAWINGS

Embodiments of the present invention are described below with reference to the figures of the accompanying sheets, in which.

DETAILED DESCRIPTION OF THE PREFERRED EMBODIMENTS

Embodiments of the invention are described below with reference to the figures.

Figure 2:
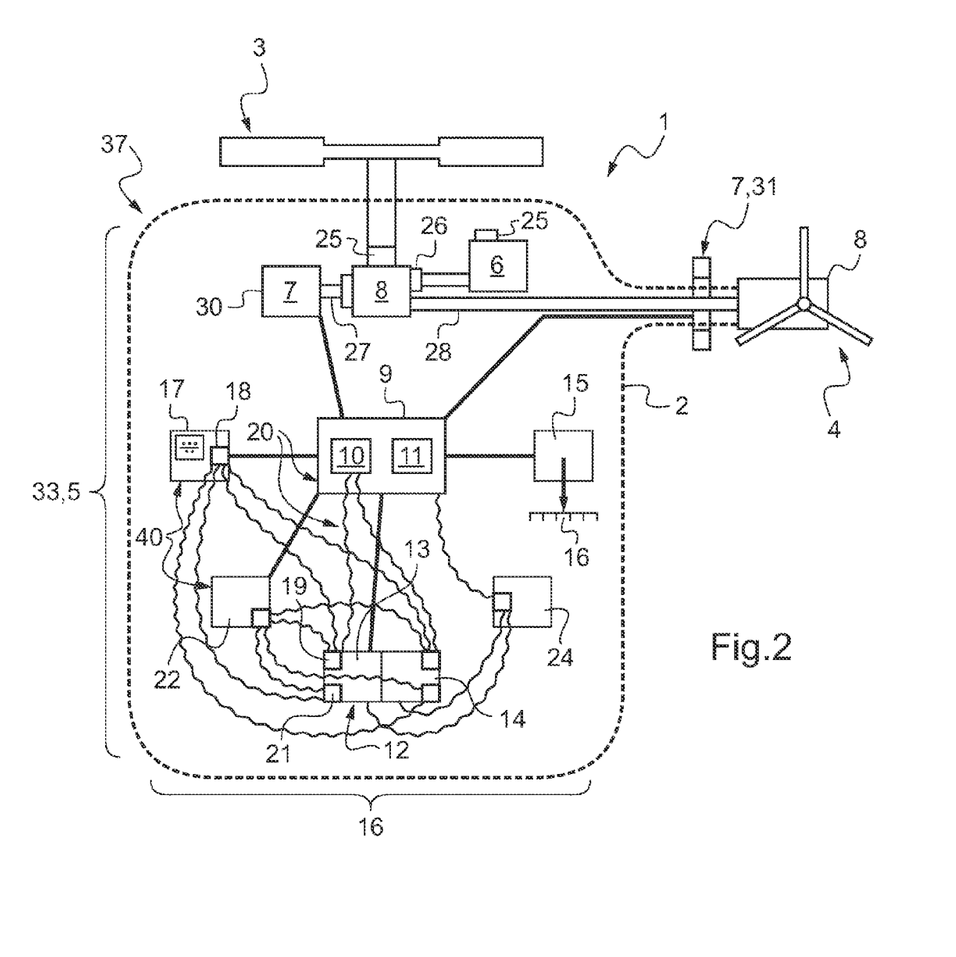
FIG. 2 is a diagram of a rotary wing aircraft of the invention fitted with a hybrid power plant itself dependent on an electrically-segregated architecture of the invention.

FIG. 2 shows a rotary wing aircraft 1, here in the form of a helicopter, having an airframe 2, a main lift rotor 3, and an anti-torque tail rotor 4. A power plant 5 comprises a (main) engine 6 and two electrical machines 7 contributing to providing drive. These two machines 7 are coupled mechanically to at least one transmission 8. In this example, each of these two machines 7 is mechanically coupled to a respective distinct gearbox, one to the main gearbox (MGB) and the other to the tail gearbox (TGB).

Naturally, most of the components of the power plant 5 also include power electronics. This applies in particular when the machine(s) 7 is/are usable as electric motors.

In this example, one of the electrical machines 7 (referenced 30 and referred to as an electric starter with a generator function) is coupled directly only to the main gearbox 8 or MGB, which is also coupled mechanically to and driven by the engine 6. The other electrical machine 7 (reference 31 and referred to as a hybrid drive or an auxiliary machine) is situated close to the tail rotor 4, being interposed between the main gearbox 8 (MGB) and the tail gearbox 8 (TGB). In some embodiments, the hybrid drive or auxiliary electrical machine 7 given reference 31 is coupled to the transmission 8 at some other location, e.g. at the main gearbox (MGB).

In this aircraft 1, the power plant 5 is provided with a regulator member 9 having a regulation processor 10 for controlling the first and second electrical machines 7 on the basis of relationships programmed in a regulation memory 11 of the regulation member 9. The regulation member 9 is electrically connected to the electrical machines 7 and to one or more devices for delivering electric charge 12.

Figure 1:
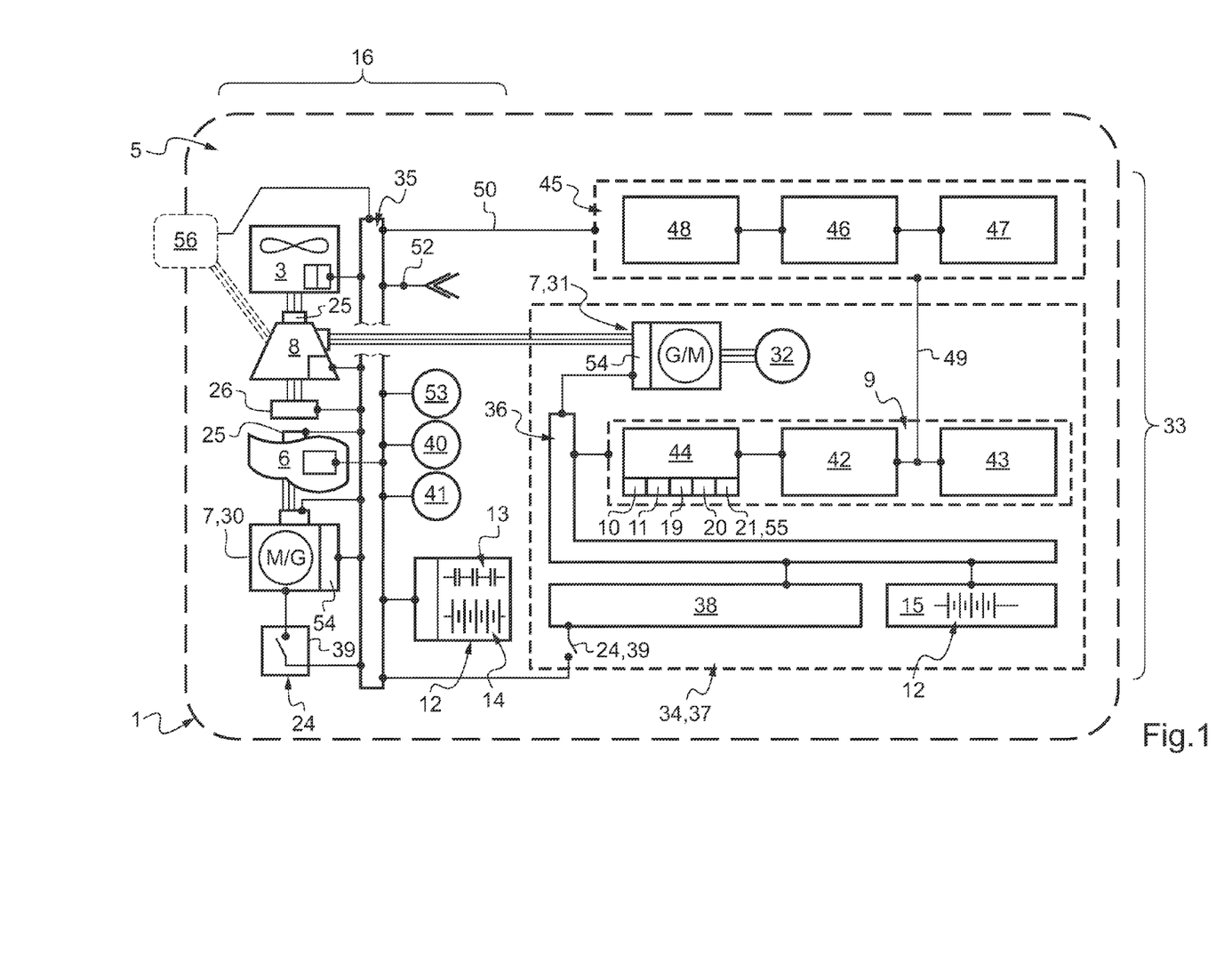
FIG. 1 is a schematic diagram showing one embodiment of an electrically-segregated architecture for a hybrid power plant of the invention, with various sensors and counters of electronic monitoring means.

In FIG. 1, a device for delivering electric charge 12 possesses a plurality of main batteries 13, 14. This device 12 is said to be a "main" device and it is connected to the on-board electricity network 16.

In addition, the regulation member 9 is electrically connected to a secondary battery 15 connected to an on-board electricity network that is known as the auxiliary electricity network 34 of the aircraft 1. The secondary battery 15 thus forms an auxiliary device 12 for delivering charge.

In the context of the invention, the on-board electricity network 16 is also referred to as the main network.

Furthermore, the power plant 5 includes display means 17 presenting various parameters concerning the instantaneous operation of the electric machine 7 in "motor" mode or in "generator" mode. The power plant 5 is thus hybrid.

For this purpose, the regulator member 9 informs a display processor 18 of the display means 17 whether it requires the electric machines 7 to operate in motor mode or in generator mode. Here, the display means 17 digitally display information concerning times of operation in motor mode or in generator mode, with the digital display being in a location or a color code that varies as a function of the instantaneous mode of operation.

In this embodiment, a first conventional measurement means 19 measures the level of charge remaining in a main device 12, e.g. a main battery 13. This remaining level of charge is delivered to the display processor 18, and the display processor 18 displays the remaining level of charge on a screen for the attention of the pilot of the aircraft 1.

In FIG. 2, the display means 17 show a remaining operating time for the electrical machines 7, with at least one second measurement means 20 measuring the remaining operating time and delivering this operating time to the display processor 18.

In order to simplify the installation, the second measurement means 20 comprise the first measurement means 19 and the regulation member 9, with the regulation member deducing in real time the remaining operating time as a function firstly of the level of charge in the charge-delivery device 12 having the main batteries 13-14, and secondly of the maximum power that can be supplied by the electrical machines 7.

Furthermore, third measurement means 21 coupled to the main battery 13 measure the temperature of this charge-delivery device 12 and send it to the display processor 18 for display on a display screen included in the means 17.

In order to assist the pilot, the power plant 5 shown in FIG. 2 includes alarm means 22 provided with an alarm processor 33 for generating an audible and/or visible alarm when:
the remaining level of charge passes below a predetermined charge threshold level;
the remaining operating time passes below a predetermined time threshold; or
the temperature of one or more devices 12 (e.g. the batteries 13-14) passes above a predetermined threshold temperature.

An intermediate alarm is provided to inform the pilot that the temperature runs the risk of exceeding said temperature threshold.

In order to switch the electrical machines 7 on or off, the pilot uses disconnection means 24 of the device 12. As described below, these means are in the form of a contactor 39 shown in particular in FIGS. 1, and 3-5 for connecting or isolating.

Figure 4:
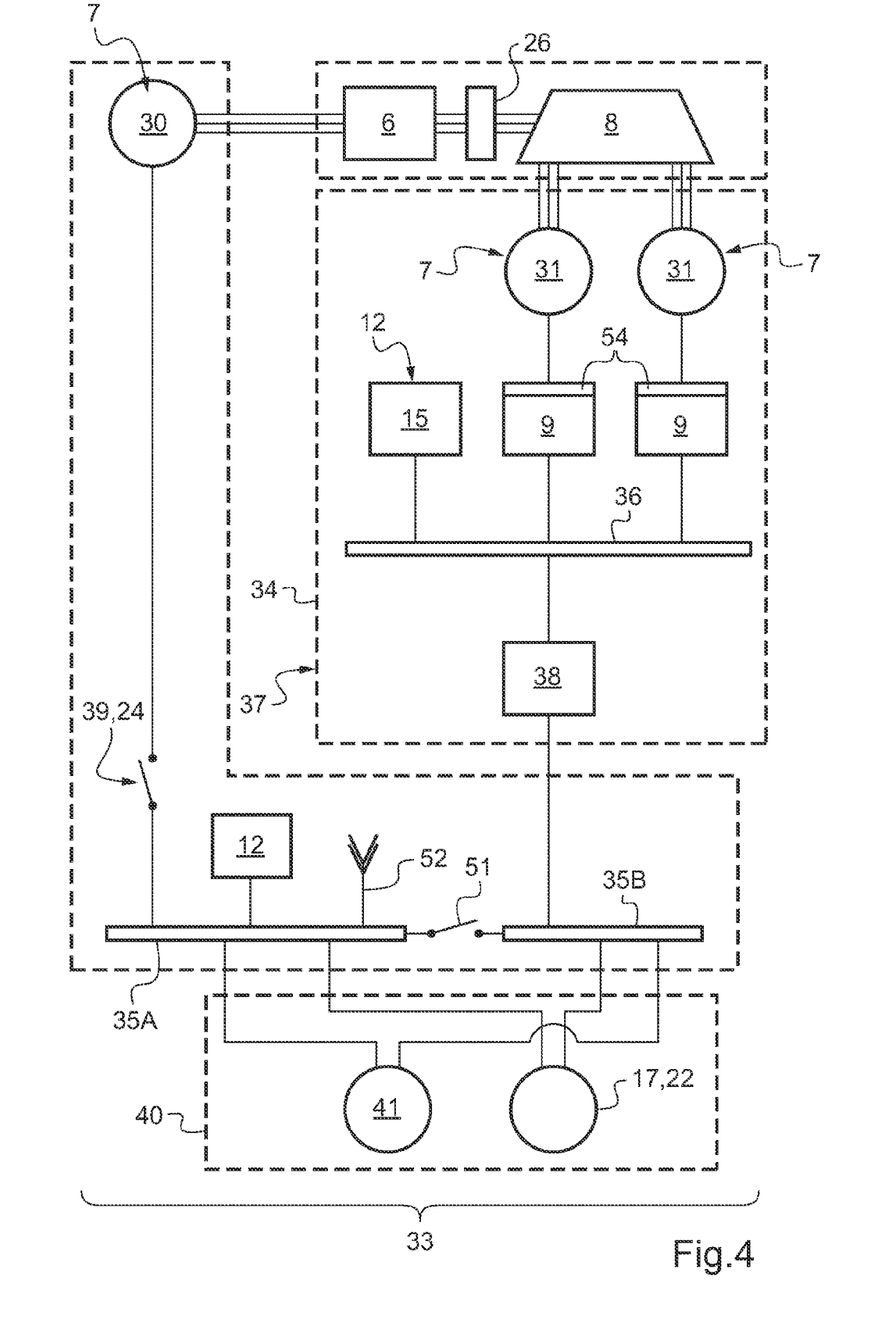
FIG. 4 is a diagram of a rotary wing aircraft fitted with an electrical architecture of the invention including a single-engined power plant with two electrical hybrid drive machines, each coupled to a main gearbox (MGB), the on-board network having two electrical buses that are separable by a splitter switch.
Figure 5:
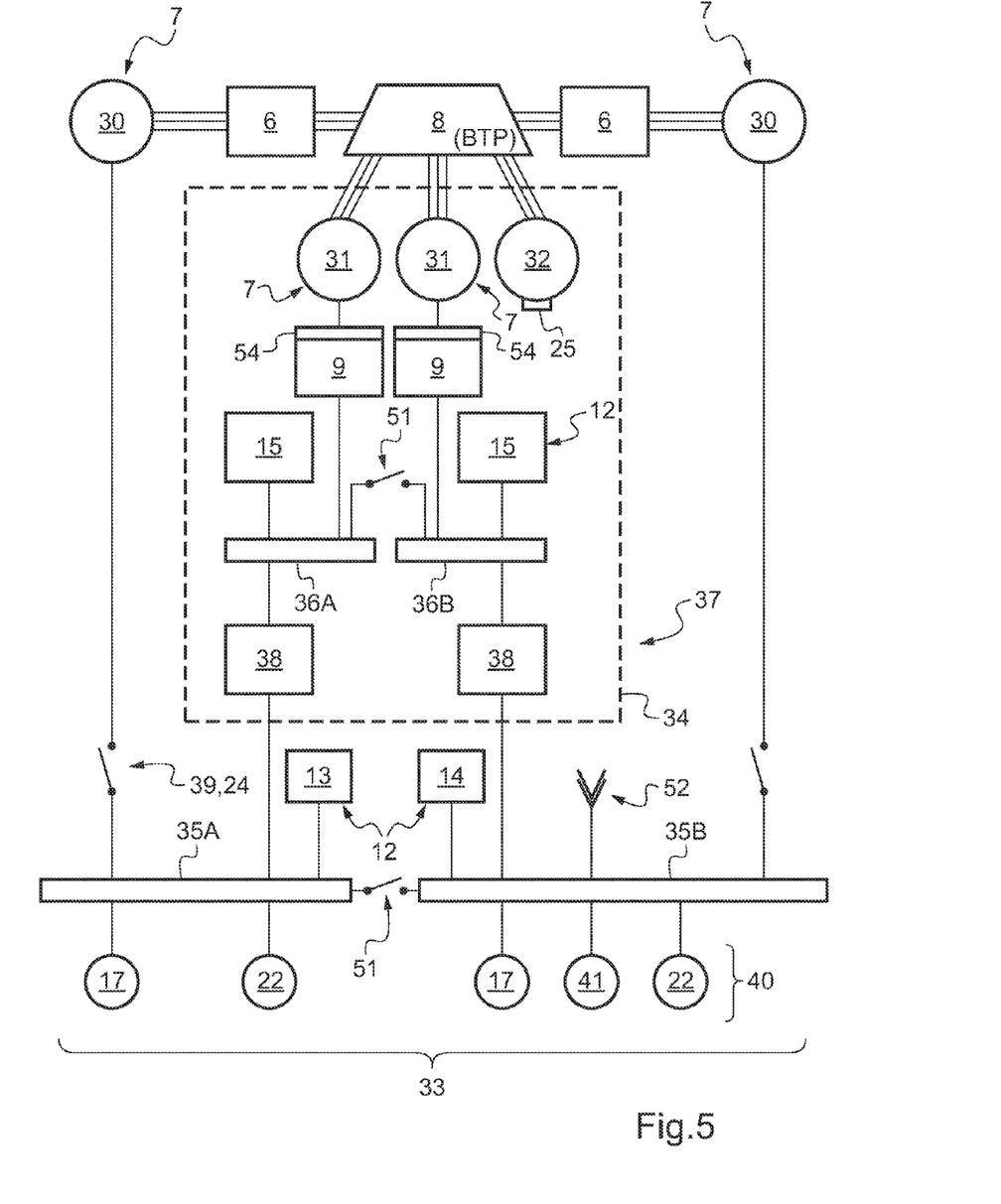
FIG. 5 is a diagram of a rotary wing aircraft fitted with an electrical architecture of the invention, having a two-engined power plant and a pair of hybrid drive electrical machines coupled to the transmission in parallel with a kinetic energy recovery system.

The connecting/isolating contactor 39 should be distinguished from another contactor 51 for splitting that is dedicated to separating the networks 16 and 34, e.g. as shown in FIGS. 4 and 5.

So long as the engine 6 is operating normally, i.e. developing the power required by its specifications, and so long as the mode of operation is normal, the transmissions 8 (including the main gearbox MGB and the tail gearbox TGB) are driven solely by the engine 6.

In contrast, if the moving members of the engine 6 are turning at speeds close to or equal to those banned by the manufacturer, the engine 6 is considered to be in overspeed, which runs the risk of damaging it. Speed sensors 25 dedicated for this purpose deliver overspeed information to the regulation member 9, some of them measuring the speed of rotation of said members of the engine 6 and others measuring the speed of rotation of the rotor 3, i.e. of the rotary wing.

This speed of rotation of the rotor 3 is representative of the speed of movement of said movable members of the engine 6 (in spite of a freewheel 26 interposed between the outlet from the engine 6 and the inlet to the gearbox 8 or MGB). Under such circumstances, the regulation member 9 triggers a first overspeed mode and orders the first and second electrical machines 7 to operate in generator mode in an attempt to slow down the engine 6.

In FIG. 2, the main gearbox MGB is mechanically connected to the engine 6 via a first outlet shaft 27, while the transmission 8 is connected to the tail gearbox TGB via a second inlet/outlet shaft 28. A second electrical machine 7 constituting a starter/generator 30 is arranged on this shaft 27. In this embodiment, a second hybrid drive machine 7 (31) and referred to as the "rear" machine is coupled to the shaft 28. Another embodiment provides for the hybrid drive electrical machine 7 (31) to be coupled to the main gearbox 8 (MGB).

At the end of a first predetermined duration, if the engine 6 is still in overspeed, the regulator member 9 or some other element of the aircraft 1 delivers overspeed information to the pilot. The pilot then stops the engine 6, e.g. via a fire shut-off cock suitable for cutting off the supply of fossil fuel to the engine 6.

This causes the speed of rotation of the rotor 3 to drop below a first given speed, and the speed of rotation of the anti-torque rotor 4 to drop below a second given speed. The regulator member 9 receives information about this speed of rotation of the rotor 3 via a sensor 25 and thus about the speed of movement of the movable members of the engine 6, and about the speed of rotation of the anti-torque rotor 4.

Under such circumstances, when the speed of rotation of the rotor 3 drops below the first given speed and when the speed of rotation of the anti-torque rotor 4 drops below the second given speed, the regulation member 9 orders the auxiliary electrical machines 7 to operate in motor mode in order to drive the rotor 3 and the anti-torque rotor 4 via the main and tail gearboxes 8 (MGB and TGB). To do this, the regulation relationship needs information in addition to the speed of rotation of the rotor 3, for example the derivative of its speed of rotation, or indeed other parameters relating to the instantaneous state of the aircraft 1, such as motorization parameters (6-7), for example.

A first overspeed mode is mentioned above. There follows a description of typical occurrences of underspeed and emergency modes.

It should be observed that the regulation member 9 then orders:
only the first electrical machine 7 (starter 30) to contribute to delivering power during a second or "underspeed" mode in order to drive the main rotor 3 if the speed of rotation of said rotor 3 drops below a first given speed;
only the second electrical machine 7 (hybrid drive machine 31) to operate as a motor in a third mode, also referred to as an "underspeed" mode, in order to drive the antitorque rotor 4 in the event of the speed of rotation of the rotor 4 dropping below a second given speed; and both the first and the second electrical machines 7 (starter 30 and hybrid drive machine 31) to operate in motor mode in a fourth mode referred to as "emergency underspeed" mode so as to drive both the rotor 3 and the rotor 4, in the event of the speeds of rotation of these rotors 3 and 4 both passing respectively below said first given speed and said second given speed.

It should not be forgotten that when in an emergency mode as traditionally defined, all of the auxiliary electrical machines 7 are called on to provide a contribution.

It should be observed that the auxiliary electrical machine 7 (hybrid drive machine 31), and the associated device 12 for delivering electric charge and the regulation member 9 in this example are electrically independent from the usual equipment 41 of a helicopter (display means 17, alarm means 22, ...), in particular from the power electronics for controlling the engine 6 and from the on-board electricity network 16. Under such circumstances, the arrangement of FIG. 2 constitutes emergency means that are effective in the event of those conventional pieces of equipment 41 (17, 22, etc.) malfunctioning or even failing.

Within the electrical machines 7, the starter 30 and the machine that acts as a hybrid drive auxiliary motor 31 are connected to the (main) on-board electricity network 16 and to an auxiliary or hybrid drive electricity network 34, respectively.

In FIG. 1, the general electrical architecture of the invention for generating electricity and for providing hybrid drive on board the aircraft 1 is given overall reference 33.

Figure 3:
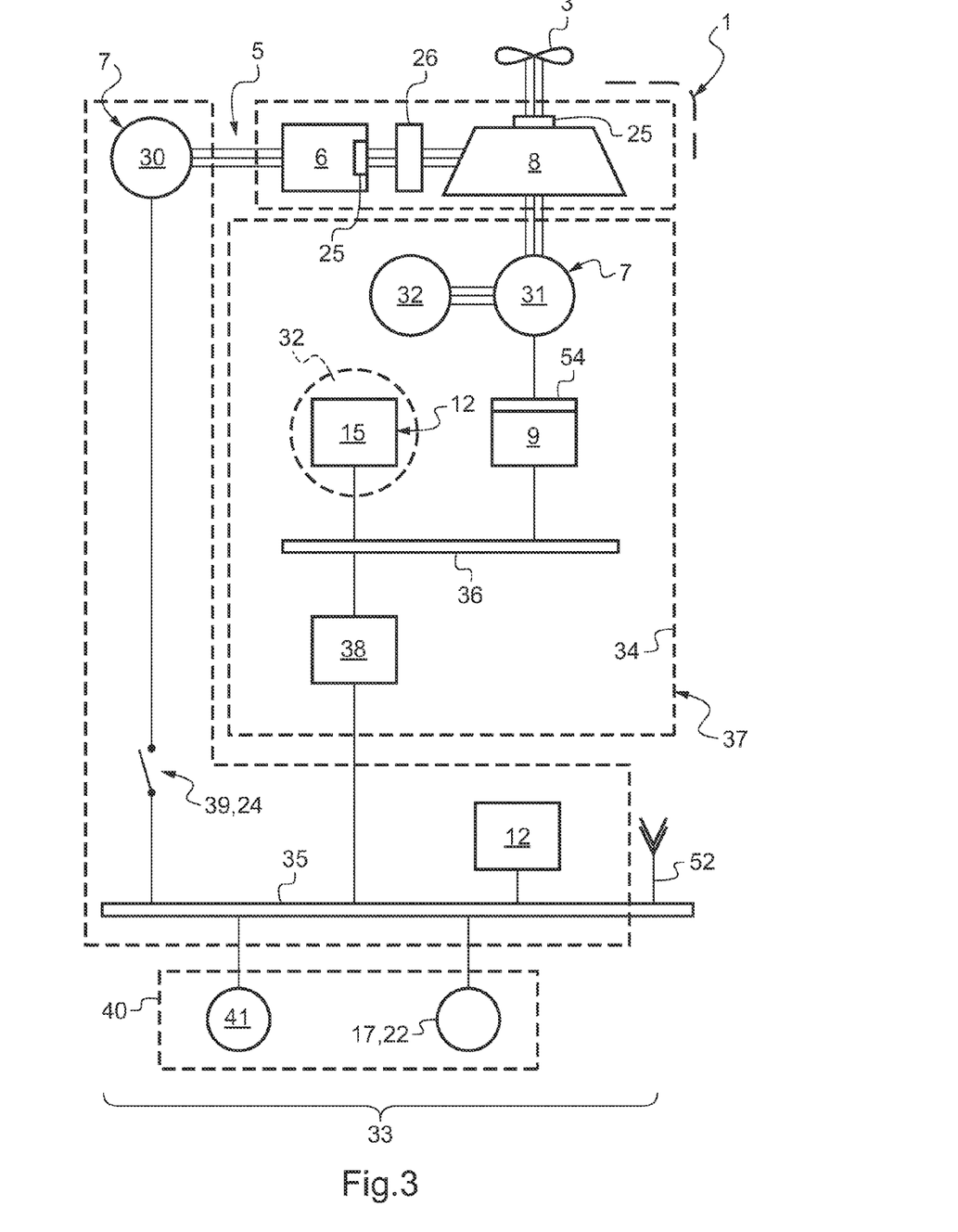
FIG. 3 is a diagram of a light rotary wing aircraft fitted with an electrical architecture of the invention, having a single-engined power plant (a diesel engine in some embodiments) and a hybrid drive electrical machine having a kinetic energy recovery system coupled thereto, in one embodiment a kinetic energy recovery system is mounted on the auxiliary network instead of the battery.

In FIGS. 1 and 3 to 4, functional connections that were originally mechanical between certain components of the power plant 5 of the invention are drawn with triple lines. Those that are more exclusively electrical are drawn with single lines. It should be observed that connections that were originally mechanical frequently need to be backed up by an electrical connection, e.g. between power electronics and control.

In an embodiment having two auxiliary machines 7 (31) similar to that shown in FIG. 5, a busbar 36A and another busbar 36B are provided within the network 34. Like FIG. 4, this provides two power supplies. In an embodiment that is not shown in which two power supplies are not available, it would be essential to have two auxiliary busbars (36A, 36B) if it is necessary to provide the same level of functionality and safety. Having two machines 31 with a single auxiliary busbar and two power supplies for on-board network loads (as in the embodiment shown) may for example correspond to design constraints competing with an electrical balance overview or optional vision.

This applies to the connections between the main gearbox 8 and the lift rotor 3, between the main gearbox 8 and the engine 6, or between each of the electrical machines 7 (starter/generator and hybrid drive/auxiliary machines), or indeed between the hybrid drive/auxiliary electrical machine 7 (31) and a kinetic energy recovery system 32 (FIG. 3). Naturally, in parallel with certain mechanical functionalities, exchanges of an electrical kind contribute to the electrical architecture 33. In FIG. 3, dashed lines illustrate a possibility of substituting the auxiliary charge-delivery device 12 with such a kinetic energy recovery system 32, which system is connected only electrically within the network 34 of the power plant 5 (i.e. not having any mechanical outlet for driving the transmission 8).

In FIG. 3, one embodiment uses dashed lines to show an alternative for the kinetic energy recovery system 32 (shown in dashed lines) connected to the auxiliary network 34, taking the place of the battery (such that 12 and 32 are the same).

In FIGS. 1 and 3 to 5, the on-board electricity network 16 possesses at least one main electrical bus 35, while the auxiliary electrical network 34 has (at least) one auxiliary electrical bus 36 arranged thereon, i.e. a hybrid drive bus. In FIG. 4, the on-board electricity network 16 possesses two main electrical buses 35A and 35B, connected together by a splitting contactor 51.

When, as in FIG. 5, the auxiliary electricity network 34 has a plurality of auxiliary electrical buses, they are given references 36A and 36B.

In FIG. 5, there can be seen two auxiliary batteries 15, one on a busbar 36A and the other on a busbar 36B.

In FIG. 3, a hybrid power plant 5 is arranged to drive a single main gearbox 8 (MGB) that engages a rotor 3 fitted to the rotary wing aircraft 1. This power plant 5 naturally includes a main engine 6 in the form of a single turboshaft engine suitable for driving the main gearbox 8 (MGB). This hybrid power plant 5 is single-engined, since it has only one engine 6. In this example also, a freewheel 26 is interposed between the gearbox 8 and the engine 6 in order to allow auto-rotation in an emergency, by decoupling.

In FIG. 3, the aircraft 1 is typically a light aircraft, and its engine 6 is of the diesel type or the linked-turbine type. Other embodiments include free-turbine engines 6.

As shown in FIG. 2, the hybrid power plant 5 of FIG. 3 includes an electrical machine 7 constituting a starter/generator 30, which machine is also mechanically connected to the main gearbox 8 (MGB) for occasionally driving it in rotation. This electrical machine 7 constituting a starter 30 is capable of driving the main gearbox 8 either on its own or in addition to the gearbox being driven by the engine 6.

This main power plant including the engine 6 uses the machine 7 forming the starter/generator 30 to initiate drive of the engine 6. This machine 7 referred to as a starter/generator 30 is also arranged as a generator or analogous member that is suitable for generating electricity appropriately, having characteristics that comply with the characteristics of the auxiliary electricity network 34.

It should be observed that the on-board electricity network 16 presents a so-called "main" nominal voltage.

In the invention, the hybrid power plant 5 of the aircraft 1 includes at least one auxiliary electricity network 34 having one or two buses (36 or 36A and 36B, as the case may be) forming part of a hybrid drive system 37.

The hybrid drive system 37, and more particularly the auxiliary electrical network 34 and thus the dedicated auxiliary electrical bus 36 operates at an "auxiliary" nominal voltage. In the invention, the main electrical bus 35 (where appropriate 35A, 35B) and the hybrid drive auxiliary electrical bus 36 are distinct, such that the main or on-board electricity network 16 and the auxiliary electricity network 34 are said to be electrically separate, i.e. they are distinct.

As a result of this separation, in FIGS. 1 and 3 to 5, a selective adaptation interface 38 is provided for exchanging energy between the on-board and auxiliary electricity networks 16 and 34. The nominal voltage and/or phase type (DC, or single-phase, two-phase, or three-phase AC) may be, and in general are, different for the on-board electricity network 16 and for the auxiliary electricity network 34.

In the embodiments of FIGS. 3 to 5, the on-board electricity network 16 has a main nominal voltage of 28 V and a main phase type that is direct current (DC). This voltage and this phase type are distinct, i.e. different, within the auxiliary electricity network 34, and in this example it presents an auxiliary nominal voltage of the order of 270 V or 540 V. The phase type of the auxiliary network is likewise direct current (DC).

When the phase types of the main and auxiliary networks 16 and 34 are different, then the selective adaptation interface 38 for exchanging energy between the two electricity networks includes at least one phase converter, e.g. between AC on the auxiliary network 34 and DC on the main network 16. The phase converter is usually reversible, thus enabling energy to be exchanged from the DC of the network 16 to the AC of the auxiliary network 34. The interface 38 may thus perform DC/AC and/or AC/DC conversions depending on the circumstances.

If the nominal voltage is distinct between the main and auxiliary electricity networks 16 and 34, the phase converter of the selected adaptation interface 38 also forms a voltage transformer. In general, the interface 38 is reversible between delivering energy to the (main) on-board electricity network 16 and delivering energy to the auxiliary electricity network 34. Thus, for the voltage values mentioned, the interface 38 can thus perform voltage conversion from 270 V or 540 V to 28 V and/or from 28 V to 270 V or 540 V. In the examples below, these are referred to as low voltage and as high voltage.

In embodiments in which the main and auxiliary voltages are identical or at least compatible (e.g. a lightweight helicopter drone), the selective adaptation interface 38 for exchanging energy between the on-board and auxiliary electricity networks 16 and 34 merely comprises one or more connecting/isolating contactors 39 that act as disconnection means 24.

In FIGS. 3 to 5, in order to separate the electricity generation channels, such a contactor 39 is interposed in parallel with the converter of the interface 38 between the electrical machine 7 forming the starter 30 and the main electrical bus 35.

Naturally, such a contactor 39 is not put into place in order to distinguish two voltages or two types of phase. The voltages and types of phase (between the networks 16 and 34) are the same on both sides of a contactor 39 when it is closed.

As can be seen from the FIGS. 1, 3-5) the machine 7 constituting a starter/generator 30 is mechanically engaged with the engine 6 in order to set it into rotation when starting the main power plant of the aircraft 1.

Alternatively, the machine 7 constituting the starter/generator 30 is mechanically engaged with the engine 6 in order to take mechanical energy from the main power plant. Taking mechanical energy in this way is for the purpose of generating an electrical power supply (e.g. at low voltage):
 for a device 12 for delivering charge (to main batteries 13 or 14, providing a reserve of low voltage energy); and/or
 for the on-board electricity network 16 (e.g. a low voltage network).

The energy reserve formed by the device 12 is also used conventionally for powering the on-board electricity network 16 and the machine 7 forming the starter/generator 30 when it is used for driving the engine 6 while it is being started.

In the invention, as can be seen in particular in FIG. 1, each charge-delivery device 12, regardless of whether it is a main and/or an auxiliary device, has available at least two sets of storage units of the electrochemical type and/or of the capacitive type and/or of the kinetic energy type (flywheel). Thus, the secondary battery 15 possesses both electrochemical and capacitive storage units.

The on-board electricity network 16 serves to power on-board equipment 40 of the rotary wing aircraft 1, emergency loads 41 (i.e. an auxiliary device 12 on the bus or buses 35 or 35A, 35B of the network 16) or other on-board electrical members.

It can be understood that the display means 17, the measurement means 19 to 21, the alarm means 23, or indeed the sensors 25 or the like are connected to the main network 16 and should be considered as forming parts of the equipment 40.

Other parts of the equipment 41 perform additional functions, for example functions that consume large amounts of energy such as: de-icing, winching, ventilation, and air conditioning, that need to be incorporated in the aircraft 1. This equipment performing additional functions is shown diagrammatically at 41 in FIGS. 3 to 5.

The main network 16 powers the equipment 40 and the emergency loads (e.g. indicators, alarms, altimeters, radio links, etc.). The equipment 40 of the de-icing, winching, etc. type constitutes normal loads.

That said, the description returns to the connecting/isolating contactor 39 of the means 24. In FIGS. 3-5, this contactor 39 that is interposed in the main electricity network 16 selectively allows or prevents electricity (e.g. at low voltage) to pass between the machine 7 and the on-board electricity network 16.

In FIGS. 3-5, the power plant 5 includes the electrical machine 7 constituting the hybrid drive machine 31 within the auxiliary electricity network 34.

This auxiliary electric machine 7 (31) is arranged as an electricity generator (e.g. at high voltage), (i.e. it is capable of acting as a generator), but it is also referred to as a "motor" since it is capable of performing the hybrid drive function. This hybrid drive electric motor (machine 31) incorporates power electronics for controlling its operation. The hybrid drive electrical machine 7 (31), or "motor", is mechanically engaged with the tail gearbox 8 (TGB) in order to set it into rotation when so required by delivering mechanical energy additional to the mechanical energy delivered by the engine 6, or in isolation, e.g. in the event of the engine 6 failing, so as to allow the pilot to land the aircraft 1. The gearbox 8 is likely to be put into rotation occasionally by the hybrid drive machine 7 (31) or "motor" in the event of special flight controls, such as for a "high wind" start or to assist in starting the engine 6 by taking the place of a mechanical clutch mechanism, e.g. a friction clutch or the like.

In FIGS. 3-5, the electrical machine 7 forming a hybrid drive machine 31 is also engaged with the gearbox 8 so as to take off mechanical energy. Such mechanical energy takeoff enables the electrical machine 7 (hybrid drive machine 31) to generate electricity (e.g. at high voltage) and/or to assist in controlling flight, e.g. in braking the rotor 3. The electricity as generated in this way (e.g. at high voltage) can be used for delivering energy to the auxiliary device 12 for delivering electric charge in the electrical architecture 33. This auxiliary charge-delivery device 12 forms a supply of energy. In the event of the engine 6 failing, the main battery 13 powers the emergency loads while the auxiliary battery 15 powers the hybrid motor formed by the at least one auxiliary machine 7 (31).

This device 12 (auxiliary or secondary battery 15 in FIG. 1) of the hybrid power plant 5 is mounted on the auxiliary electricity network 34. This device 12 or secondary battery 15 serves in particular to power the motor function of the auxiliary machine 7 (31), and also the on-board electricity network 16 and/or the charge-delivery device 12 of the main network 16, in particular via the interface 36 (with a converter if the voltages and/or phases are distinct between the networks 16 and 34, as in FIGS. 3-5).

With reference to FIG. 1, it can be seen that in this embodiment, the auxiliary electricity network 34 includes a regulation member 9 or monitoring and piloting module. This member 9, also referred to as a regulation module, associates monitoring means 42 and control means 43 for controlling the operation of the power plant 5, and in particular of an electrical architecture 33 and its hybrid drive system 37.

These monitoring means 42 are dependent on various measurement, analysis, and memory means 44. Typically, components of these means 44 include equivalents of the processor 10 and its memory 11, and also the first to third measurement means 19-21 mentioned above with reference to FIG. 2.

The measurement, analysis, and memory means 44 serve to detect a failure in the operation of the power plant 5.

In the embodiment of FIG. 1, the electronic monitoring means 42 are associated with various measurement and memory means 44 including at least one of the following components:

- at least one voltage sensor (reference 19) for sensing the voltage of at least one of the main electricity network 16 and/or the auxiliary electricity network 34, and associated with comparator means for comparing the sensed voltage(s) with at least one setpoint voltage. For example, the setpoint voltages may correspond to respective high and low threshold voltages for one and/or the other of the main and auxiliary electricity networks 16 and 36. The network 36 includes voltage sensors 19 on at least the auxiliary machine 7 (31), the charge-delivery device 12, and the interface 38, in particular if it includes a converter;
- at least one current sensor (also referenced 19) for at least one of the main and/or auxiliary electricity networks 16 and/or 36, the sensor being associated with comparator means for comparing the sensed current(s) with at least one setpoint current. For example, the setpoint current may correspond to acceptable maximum and/or minimum loads for one and/or the other of the devices 12 forming the main energy reserve and forming the auxiliary energy reserve. Also for example, a safety current setpoint corresponds to a short circuit in one and/or the other of the main and auxiliary electricity networks 16 and/or 36 in order to cause one or more disconnection means (e.g. 24, 39, or 51) to be operated;
- at least one temperature sensor (also referenced 21) for sensing the temperature of at least the main and/or auxiliary electricity networks 16 and/or 36. The temperature sensor 21 is associated with comparator means for comparing the sensed temperature(s) with at least one setpoint temperature, in order to warn of potential overheating of at least one of said components of the plant 5;
- at least one sensor 55 of the drive speed of at least the starter 30 and/or the hybrid drive generator 31. This speed sensor 55 is associated with means for analyzing the level of charge in at least one of the main and/or auxiliary energy reserve forming devices 12. For a system 32 that saves energy using inertia and that contributes to powering at least one or the other of said energy reserve devices 12, such a sensor 55 serves to determine their instantaneous charge level; and
- at least one counter (also referenced 55) for counting the number of recharging and discharging cycles of at least one of the devices 12 forming the main and/or auxiliary energy reserves, associated with means for analyzing their lifetimes. This sensor/counter 55 is incorporated in this example in the means 20 for deducing the real operating time.

In FIG. 1, the aircraft 1 includes an auxiliary power unit 56 (APU) with an auxiliary generator. This auxiliary power unit 56 is mechanically connected to said transmission 8 (e.g. MGB, TGB, or the like) of the hybrid power plant 5 so as to be connected to and deliver electricity to the on-board and/or auxiliary electricity network 16 and/or 34 during certain stages of flight.

Furthermore, in FIG. 2, it can be seen that the piloting interface 45 of the rotary wing aircraft 1 is in communication with the monitoring and piloting member/module 9 to allow the pilot control the operation of the power plant 5, possibly in parallel with the on-board electronic systems (e.g. the full authority digital engine controller (FADEC), the autopilot, the attitude heading reference system (AHRS), etc.). Such a piloting interface 45 includes in particular a manual control desk 46, a flight controller 47, and information means 48 such as audible and/or visible alert means concerning the operating state of the power plant 5. In spite of its adaptations, connections, and exchanges with the auxiliary electricity network 34 and the hybrid drive system 37, this piloting interface 45 is generally of a conventional structure within an on-board electricity network 16, i.e. a main network of an aircraft 1. Furthermore, in FIG. 1, there can be seen an electrical and logical connection 49 between the interface 45 and the auxiliary electricity network 34 of the hybrid drive system 37. It can also be seen that this interface 45 is electrically connected via the electrical and logical connection 50 to the on-board electricity network 16 of the aircraft 1.

The information means 48 include audible and/or visible alert means such as the alarm means 22, and the display means 17 mentioned above with reference to FIG. 2.

Various specific features made possible by the electrical architecture 33 of the hybrid drive system 37 are emphasized:

- splitting of the power plant 5 into two distinct individual drive installations and networks, each having its own electricity generator and its own energy reserve, e.g. at low voltage for the main drive and at high voltage for the auxiliary drive in FIGS. 3-5;
- these two individual drive installations and networks are put into communication with each other for mutual assistance in terms of electrical energy; and
- independent or combined drive of the transmission 8 from the engine 6 and/or from at least one auxiliary machine 7.

This makes the following possible, amongst other possibilities:

- making the rotary wing aircraft 1 more reliable and safe, in particular if it has only one engine;
- providing specific piloting functionalities; and
- enabling a single-engined rotary wing aircraft 1 to satisfy instrument flight rules (IFR) in terms specifically of electricity generation. The invention makes it possible for the supply of electrical energy on board the aircraft 1 to be made compatible with the safety objectives enabling a single-engined aircraft 1 to be used in IFR mode.

In an "electricity generator" mode of operation of the invention, the plant 5 is used to charge or maintain the level of charge in the energy reserve forming devices 12 and/or to power the on-board electricity network 16, or indeed to dissipate as a safety measure any surplus electricity (e.g. at high voltage) that might be produced by making use of electricity consuming members 53 (FIG. 1) such as dedicated resistances or other analogous electrical members.

In this mode of operation, the hybrid drive auxiliary machine 7 (31) operating as a generator takes mechanical energy from the gearbox 8. The contactors 24, 39 are in the closed position, and the machine 7 constituting the starter/generator (also referenced as 31) powers the on-board electricity network 16, and more particularly powers the on-board equipment 40 and the device 12 of the network 16 constituting emergency loads.

It should be observed here that the hybrid drive system 37 includes at least one kinetic energy recovery system (KERS) 32 that is mechanically and/or electrically connected to the auxiliary electrical machine 7 (31) to recover a fraction of the kinetic energy generated when it decelerates. This recovery system 32 is electrically connected to the auxiliary electricity network 34 in such a manner as to be capable of powering said auxiliary electrical machine 7 (31) should that be necessary, in return.

Furthermore, the hybrid drive machine 7 (31) forms an auxiliary unit capable of powering the auxiliary electricity network 34 in order to recharge the energy reserve forming device 12 (e.g. at high voltage like the secondary battery 15), in particular in the event of the generator function of the machine 7 forming the main generator 30 failing. For this purpose, the interface 38 of the network 34 includes a bidirectional and reversible converter 38.

FIG. 4 also shows a splitting contactor 51 suitable for selectively allowing electricity to pass from the main on-board electricity network 16 to the auxiliary electricity network 34, in particular by interrupting the electrical connection between the two segments 35A and 35B of the main electrical bus 35, upstream from the charge-delivery device 12.

In FIG. 5, an auxiliary splitting contactor 51 forms part of the auxiliary network 34. This auxiliary contactor 51 is suitable for selectively allowing electricity pass from the main on-board electricity network 16 or from the auxiliary electricity network 34, in particular by interrupting the electrical connection between the two segments 36A and 36B of the auxiliary electrical bus 36, upstream from the auxiliary charge-delivery device 12 constituted in this example by the battery 15.

In this embodiment, the power plant 5 includes a single main gearbox (MGB), and two auxiliary electrical machines 7 (31) directly connected thereto. This hybrid drive system 37 is said to be a multichannel system because it has at least two auxiliary electrical machines 7 (31). Each channel of the auxiliary network 34 possesses two auxiliary charge-delivery devices 12, two regulator members 9 (monitoring modules), and also two selected adaptation interfaces 38. Two auxiliary batteries 15 are also provided in this example. Naturally, the example in question has two channels, but the invention could be used with three or even more channels.

In a "low-cost electricity generator" mode of operation of the invention, the power plant 5 is operated so as to charge or maintain the level of charge in the main energy reserve forming devices 12 and/or to power the on-board electricity network 16, or indeed, where appropriate, to dissipate surplus electricity as a safety precaution.

In this mode of operation, the machine 7 forming a generator 31 takes energy from the gearbox 8. Meanwhile the other machine 7 is not in operation, the main contactor of the means 24 is in the open position and the electrical machine 7 acting as a generator 31 acts via the interface 38 (and the closed splitting contactor 51) to power the on-board electricity network 16 and more particularly to power the on-board equipment 40 and the emergency charge-delivery device 12 having the secondary battery 15. No mechanical energy is taken off by the machine 7 (which is then off-line) from the engine 6, thereby enabling its performance to be improved.

In a "ground electricity supply" mode of operation of the invention, the power plant 5 is powered from a parking unit 52 and/or from at least one of the on-board energy reserve forming devices 12. When the rotary wing aircraft 1 is on the ground, the energy reserve forming devices 12 are advantageously charged from the parking unit 52.

In a "engine starting" mode of operation of the invention, the power plant 5 is used to start the engine 6 of the rotary wing aircraft 1. For this operation, electricity is delivered from the energy reserve forming device 12 of the on-board network 16 and/or from the high voltage energy reserve 13, and/or from the parking unit 52 fitted to the rotary wing aircraft 1. The machine 7 forming a starter 30 drives the engine 6 where necessary in order to initiate setting it into rotation (and where appropriate in order to compress gas in a turbine) until it can run on its own. Before it runs on its own, it is necessary for the machine 7 acting as a starter 30 to do its work, even if it is assisted by the hybrid drive machine 7.

In this example, the aircraft 1 further includes an auxiliary power unit 56 (APU); this APU is mechanically and/or electrically connected to said gearbox 8 of the hybrid power plant 5 so as to be connected to and deliver electricity to the on-board electricity network 16 and/or to the auxiliary electricity network 34 in certain stages of flight.

In a "clutching" mode of operation of the installation, the engine 6 is engaged with the gearbox 8 as soon as its drive reaches an appropriate threshold speed of rotation suitable for driving the rotor 3. More particularly, the engine 6 is decoupled from the gearbox 8 while it is being started, in particular by means of a freewheel 26.

Under such circumstances, the electrical machine 7 forming a motor 31 is used to drive the gearbox 8 at a speed that is faster than the speed of rotation of the rotary elements of the engine 6 (i.e. turbine shaft, crank shaft, etc.) while starting and/or while the engine 6 is idling, such that the engine is decoupled from the gearbox 8 by the freewheel 26.

As a result, the engine 6 can start with just sufficient energy being delivered thereto to enable it to run on its own by the machine 7 acting as a motor 30 until the engine reaches a speed of operation enabling it to run on its own. Accelerating the engine 6 a little then enables it to dock with the gearbox 8 (e.g. the MGB) which is itself being driven by said machine 7 acting as a motor 31.

In a "high wind starting" mode of operation of the invention, the machine(s) 7 acting as one or more motors 31 is/are used to deliver mechanical power in addition to that delivered by the other electrical machine 7 acting as a starter 30, such that the gearbox 8 is driven at a speed that is appropriate for a "high wind" starting situation as quickly as possible.

In a "rotor braking" mode of operation of the invention, when the machine(s) 7 form(s) one or more generators 31, said machine(s) take(s) mechanical energy from the gearbox 8. This energy takeoff is suitable for being used for recharging one and/or the other of the energy reserve forming devices 12 or indeed for powering the on-board electricity network 16. It is not essential to use the mechanical energy taken off in this way, in particular when the energy reserve forming devices 12 are not in an optimum state of charge. When the mechanical energy taken off for braking the rotor(s) 3 (or one of the auxiliary rotor(s)) generates surplus electricity, this surplus is discharged via said electrical members 53 dedicated to such energy discharge.

In an "electrical drive" mode of operation of the invention the gearbox 8 is driven by the machine 7 then acting as a motor 31. The auxiliary electricity network 34 is then configured to be capable of delivering a large amount of energy over a short period in order to drive the lift rotor(s) 3. It is then not possible to take electrical energy from said machine 7, since it cannot operate simultaneously in generator mode and in motor mode.

In FIGS. 3 and 4, there can be seen different embodiments of the configuration of the main components of the plant 5. Briefly, FIG. 3 shows a rotary wing aircraft 1 fitted with an electrical architecture 33 of the invention having a single-engined power plant 5 and a hybrid drive electrical machine 7 (31). In FIG. 4, there can be seen a rotary wing aircraft 1 for the same single-engined embodiment of the invention but having two hybrid drive electrical machines 7 (31), with the on-board network 16 having two electrical busbars 35A, 35B that are separable by a splitting switch 51 in order to separate the networks 16 and 34. With at least two hybrid drive machines 7 (31), two distinct generator channels (9+54) are provided within the auxiliary network 34, but the "main" network 16 is not necessarily duplicated with two buses 35A and 35B as in FIG. 4. Equally, a single hybrid drive electrical machine 7 could indeed be provided in a single-engined configuration (6).

These embodiments show a "main" network (here a low voltage network) 16 that includes machines 7 forming starters 30 that are mechanically engaged with the engine 6 and that are engaged with their energy reserve forming device 12 via the main contactor of the means 24.

In FIG. 1, the electricity network 16 having a (main) nominal voltage of about 28 V is in communication via the electrical bus 35 (or 35A, 35B) with the on-board equipment 40 or special equipment 41, and also with the emergency electrical charge-forming device 12 and with the connectors for the parking unit 52 (where applicable, cf. FIG. 1). The auxiliary network 34 (in this case a high voltage network) includes the machine 7 forming the generator 31 that is also mechanically engaged with the gearbox 8. This machine 7 forming a generator 31 is associated with power electronics 54 but are here incorporated in the regulator member 9.

The auxiliary electricity network 34 having an (auxiliary) nominal voltage of about 270 V or 540 V (depending on the embodiment) is in communication via the auxiliary bus 36 (or 36A, 36B in FIG. 5) with the auxiliary energy reserve forming device 12, here provided with the secondary battery 15.

Furthermore, this auxiliary electricity network 34 is connected to the converter and more generally to the interface 38 via the auxiliary bus 36 to enable it to exchange energy with the main electricity network 16.

In FIGS. 4 and 5, the main electricity network 16 has two electrical buses 35A and 35B that are selectively put into communication with each other via the contactor 51 that is also suitable for splitting them. The first electrical bus 35A of the main electricity network 16 is in communication with the motor 7 forming the starter 30, with the main energy reserve forming device 12 (and where appropriate with a parking unit 52).

The on-board equipment 40 or 41 and the device 12 have two power supplies, being in communication via the second electrical bus 35B with one and the other of the two electricity networks of the architecture 33. The main electricity network 16 and the auxiliary electricity network 34 are thus technically dissociated or segregated when the contactor 51 splits them by being in its open position.

Thus, the on-board equipment 40, 41 is provided with a duplicated or redundant power supply, as on a twin-engined rotary wing aircraft. As a result, in generator mode, the hybrid system 37 provides, where necessary, the electrical power needed by the on-board network 16, providing it is not being used in "electrical drive" mode. An advantage of this architecture 33 with a split between the buses 35A and 35B, i.e. buses that are normally distinct but that are capable of being selectively coupled together, is that it contributes to achieving compatibility between supplying electrical power on board an aircraft 1 and increased safety objectives, e.g. to enable a single-engined aircraft to be used in IFR mode.

Furthermore, since the networks 16 and 34 are technologically dissimilar (in design, components, operation, and designers), and assuming that the contactor in the means 24 is open circuit, it can be shown that these networks 16 and 34 are independent in "(low cost) electricity generator" mode. In this mode, the hybrid system 37 may take off mechanical power from the gearbox 8, which may be useful for braking the gearbox, as mentioned above.

In addition, from the "low cost electricity generator" mode, it is necessary, when passing to "electrical drive" mode (which is possible), or on using the hybrid generator network 34 (e.g. a breakdown of the bidirectional interface/converter), to ensure that the reconfiguration of the network behaves in a manner relative to the electrical machine 7 forming a starter 30 and relative to the means 24 (contactor 39) that complies with the standards in force relating to powered loads (typically 50 milliseconds (ms) according to the standard EN2282). To meet this requirement, the means 24 must have their contactor 39 closed in the "low cost electricity generator" mode. Likewise, the above-mentioned advantageous failure modes remain valid in such a configuration.

In FIG. 4, it may be seen that the hybrid drive electrical drive comprises not one but a plurality of hybrid drive electrical machines 7 (31). Consequently, the power plant 5 is said to be of the "multichannel" type since it includes (at least) two hybrid drive electrical machines 7 (31), each connected to at least one auxiliary device 12 for delivering charge via the auxiliary electricity network 34. In such a system 37, the various hybrid drive electrical machines 7 (31) are all directly coupled mechanically to the gearbox 8.

Such a multichannel plant 5 presents the advantage of enabling a progressive rise in the provision of mechanical power from the hybrid drive system 37 to the gearbox 8, or conversely in the hybrid system 37 taking off mechanical power from the gearbox 8, depending on whether one, two, or more hybrid drive electrical machines 7 (31) are activated by the regulation member 9.

In particular for aircraft 1 having multiple engines 6, it may be practical to install two hybrid drive systems as mentioned. This makes it possible, for example, to dedicate one channel or "system" to electrically powering equipment 41 that draws high power, such as de-icing the rotor blades. This can be done without depriving the aircraft 1 of its hybrid drive resources, e.g. during certain stages of flight (which, like takeoff, can require extra driving or electrical power). When not providing hybrid drive, these hybrid drive systems may be unloaded and used as emergency sources—in the event of the machine 7 (30) failing but with the engine 6 remaining operational—e.g. for use by the flight control system of the aircraft 1. Under such circumstances, it is considered that the aircraft 1 is provided with four independent sources of electricity.

Figure 6:
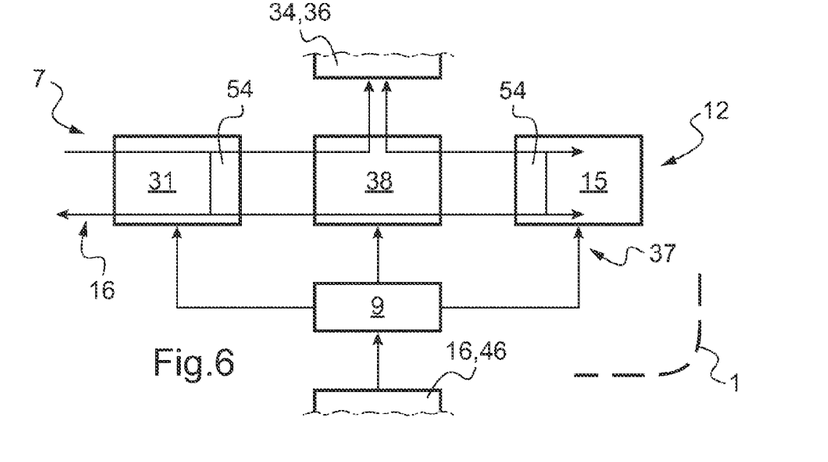
FIG. 6 is a diagram showing a detail of the electrical architecture of the invention showing the power electronics of components coupled to a module for managing electrical power and to a monitoring and control unit for the hybrid power plant of the aircraft.

With reference now to FIGS. 5 and 6, it can be seen how the invention applies to a rotary wing aircraft 1 having twin engines (two engines 6). The aircraft 1 possesses a single hybrid drive electrical machine 7 (31), but embodiments of the invention could have two engines with a multichannel type hybrid electrical drive. Like FIG. 3, it should be observed that this hybrid drive electrical machine 7 (31) is coupled to a kinetic energy recovery system 32.

FIG. 6 is a diagram showing a detail of the electrical architecture 33 in the embodiment of the invention shown more generally in FIG. 5. In this aircraft 1, the power electronics 54 and an electrical machine 7 forming a starter/generator 31, and also a charge-delivery device 12 (here having a secondary battery 15) of the hybrid drive system 37 are coupled to an adaptation interface 38 forming an electrical power management module (for the machine 7 and the device 12), and also to a regulation member 9 forming a monitoring and control unit for the hybrid power plant 5 of the aircraft 1.

Firstly the control-unit forming member 9 is in logical connection with the on-board network 16 of the aircraft 1 in particular for receiving instructions from the control desk 46. The management module interface 38 is connected electrically, in separable manner, to the auxiliary electricity network 34 via the electricity network electrical bus 36.

With such an architecture 33, the invention makes it possible momentarily (i.e. over a short duration) to deliver mechanical and/or electrical power to a resource that needs it, such as an engine 6 or an electrical machine 7. Or indeed, the invention makes it possible to supply electrical power to equipment such as 40 or 41 from a charge of energy that has previously been stored (in the form of kinetic and/or electric energy).

Such a hybrid drive system 37 provides in particular two families of operating modes, namely "standby" and "assisting drive", which families can never be provided simultaneously. By means of the control-unit forming member 9, the amount of energy that is available is measured continuously such that use of that energy is adjusted in real time. Once it is possible to take up (mechanical) energy, this is done as soon as a resource requires the delivery of mechanical or electrical power within the aircraft 1, the control-unit forming member 9 taking charge of the distribution of that power to the resource requesting it.

From the above, it can now be understood how the invention manages to solve the various technical problems explained initially.

The invention is easy to fit on numerous models of aircraft without complicating or burdening the surrounding electrical architecture (apart from adding hybrid drive). This may be made available as an option.

The invention makes it possible for architectures 33 and their components to be made uniform between models of a given range of aircraft 1 and between different ranges from a given manufacturer. In particular, because of the segregation and the possibility of designing optional hybrid drive, the hybrid drive systems 37 of the invention may be structurally relatively similar from one model to another.

Paradoxically, for a given mission profile, an aircraft 1 of the invention may be found to be remarkably simplified and lightened. Improvements have also been observed in terms of safety and reliability that are achieved by the invention.

In the event of losing one or more engines, an auto-rotation procedure may be engaged, requiring the hybrid system 37 to be fully available in "drive" mode, naturally to the exclusion of said system 37 generating any electricity.

The quantity of energy available on board the aircraft 1 at the required moments and in renewable manner is optimized by the invention. Additional functionalities, that consume large amounts of energy such as de-icing, winching, ventilation, and air conditioning, can be incorporated in an aircraft 1 of the invention. However that does not overload the motor 7 forming the starter/generator 30 that is coupled to the gearbox.

For a given overall mission profile, it is possible with the invention to achieve savings in energy consumption, and thus to satisfy future ecological implications and new regulations.

In the invention, providing hybrid drive as an option or as standard is possible even if the model of aircraft 1 in question is already close to its authorized weight limit.

In conclusion, it can be understood that the invention makes hybrid drive available, with an impact that is favorable in terms of performance (in particular for an aircraft having multiple engines, such as a twin-engined aircraft), or in terms of safety (in particular for an aircraft having a single engine).

What is claimed is:

1. A rotary wing aircraft comprising:
    a main on-board electricity network;
    a power plant having at least one rotor for being driven in rotation, and at least one transmission for driving said rotor in rotation;
    the power plant being a hybrid power plant associating at least one main combustion engine with at least one hybrid drive auxiliary electrical machine;
    the main engine and the auxiliary electrical machine being mechanically coupled to the transmission;
    said auxiliary electrical machine being placed within the hybrid power plant to constitute in turn a member for mechanically driving the transmission or a member for generating electricity under the effect of being driven mechanically by said transmission;
    the on-board electricity network possessing at least one main electrical bus at a main nominal voltage;
    the main electrical bus having connected thereto at least one main device for delivering electric charge with at least one main storage battery, and a main electrical machine acting as a starter that is reversibly operable as a generator, said main electrical machine forming a starter being mechanically connected to said engine, wherein the hybrid power plant includes at least one hybrid drive system with at least one auxiliary electricity network for providing hybrid drive purposes, the auxiliary electricity network possessing a dedicated auxiliary electrical bus at an auxiliary nominal voltage, the auxiliary electrical machine being connected to the auxiliary electrical bus at the auxiliary nominal voltage;
    the main electrical bus and the hybrid drive auxiliary electrical bus being connected together via a selective adaptation interface in such a manner that the main on-board electricity network and the auxiliary electricity network are electrically distinct from one another, the selective adaption interface being configured to enable electrical energy to be exchanged selectively between the main and auxiliary electricity networks.

2. An aircraft according to claim 1, wherein the machine forming a starter is electrically connected to the main network via disconnection means of a main device for delivering electric charge within the main network;
    whereas the auxiliary electrical bus has electrically connected thereto firstly a monitoring and control module or member together with said auxiliary machine, and secondly at least one selected adaptation interface arranged by selective connection to the main electricity network to enable electrical energy to be exchanged selectively between the main and auxiliary electricity networks.

3. An aircraft according to claim 1, wherein said auxiliary machine that is mechanically connected to said transmission is electrically connected to the auxiliary electrical bus in parallel with at least one auxiliary device for delivering electric charge and at least one secondary storage battery;
    the auxiliary charge-delivery device, the monitoring member, the auxiliary machine, the auxiliary network, and the selective adaptation interface forming parts of the hybrid drive system.

4. An aircraft according to claim 1, wherein the power plant includes a single main gearbox (MGB) mechanically connected to at least one lift rotor of the aircraft and to a single engine such as a turboshaft engine or a diesel engine;
  at least one auxiliary electrical machine being connected to said gearbox.

5. An aircraft according to claim 4, wherein the power plant includes a single main gearbox (MGB), and at least two auxiliary electrical machines connected to said gearbox.

6. An aircraft according to claim 1, wherein the power plant includes a single main gearbox (MGB) that is mechanically connected to at least one lift rotor of the aircraft and to a plurality of engines, such as two turboshaft engines or two diesel engines;
  at least one auxiliary electrical machine being connected to said gearbox.

7. An aircraft according to claim 1, wherein the power plant includes at least one auxiliary gearbox (AGB) mechanically connected to at least one auxiliary rotor such as one or more tail rotors and/or one or more propulsion rotors of at least one lateral arrangement of propellers for a long-range high-speed rotary wing aircraft;
  at least one auxiliary electrical machine being connected to said gearbox.

8. An aircraft according to claim 1, wherein at least one switch is arranged in the hybrid drive system between two main and/or auxiliary buses.

9. An aircraft according to claim 1, wherein the on-board electricity network is at a main nominal voltage and/or uses a main phase type that is/are distinct respectively from an auxiliary nominal voltage and/or an auxiliary nominal phase type for the auxiliary electricity network;
  in which case the interface includes at least one phase converter.

10. An aircraft according to claim 9, wherein the nominal voltage and/or phase type are distinct between the main and auxiliary electricity networks, at least one phase converter of the selective exchange adaptation interface is reversible between an energy exchange direction in which electricity is delivered to the main network and an energy exchange direction in which electricity is delivered to the auxiliary electricity network.

11. An aircraft according to claim 1, wherein at least one main and/or auxiliary device for delivering electric charge is of the electrochemical and/or capacitive and/or kinetic energy type.

12. An aircraft according to claim 1, wherein the hybrid drive system is a multichannel system that includes at least two hybrid drive electrical machines, each having in common at least one auxiliary device for delivering electric charge and/or a monitoring module or member, and/or a selective adaptation interface.

13. An aircraft according to claim 1, wherein the hybrid drive system is a multichannel system and includes at least two auxiliary electrical machines, each channel having at least one auxiliary device for delivering electric charge and/or a monitoring module and/or a selective adaptation interface specific thereto.

14. An aircraft according to claim 1, wherein the hybrid power plant includes at least one main engine in the form of a turboshaft engine coupled to a machine forming a starter that can be operated reversibly as a generator and that is mechanically engaged with the turboshaft engine and placed on a main electricity network at low voltage;
  a hybrid drive system including at least one auxiliary electrical machine in the form of a high voltage electric motor/generator, said auxiliary electric motor being mechanically engaged with the transmission and being placed on the high voltage auxiliary electricity network of said hybrid drive system.

15. An aircraft according to claim 1, wherein the hybrid power plant includes electronic means for controlling operation of the main engine(s) and/or of the auxiliary electric motors, said means being in communication with at least one manual control desk and/or a flight controller of the hybrid power plant and connected to and powered by the main electricity network.

16. An aircraft according to claim 1, wherein the hybrid power plant includes electronic means for monitoring the state and the operation of the main engine(s) and/or of the auxiliary electrical machine(s), said monitoring means being connected to and powered by the main electricity network.

17. An aircraft according to claim 16, wherein the monitoring means are in communication with means providing information about the state and the operation of the main engine(s) and/or of the auxiliary electrical machine(s), said monitoring electrical machines being connected to and powered by the main electricity network.

18. An aircraft according to claim 1, wherein the aircraft includes an auxiliary power unit with an auxiliary generator; said auxiliary power unit is mechanically connected to said transmission of the hybrid power plant in such a manner as to be connected to and deliver electricity to the on-board electricity network and/or to the auxiliary electricity network in certain stages of flight.

19. An aircraft according to claim 16, wherein the electronic monitoring means are associated with measurement, analysis, and storage means that include at least one of the following components:
  a voltage sensor for sensing the voltage of at least one of the main electricity network and/or the auxiliary electricity network, said voltage sensor being associated with comparator means for comparing the sensed voltage(s) with at least one setpoint voltage;
  a current sensor for sensing the current in at least one of the main electricity network and/or the auxiliary electricity network, said current sensor being associated with comparator means for comparing the sensed current(s) and at least one setpoint current;
  a temperature sensor for sensing the temperature of at least one of the main electricity network and/or the auxiliary electricity network, the temperature sensor being associated with comparator means for comparing the sensed temperature(s) and at least one setpoint temperature;
  analyzer means for analyzing the level of charge in at least one charge-delivery device of the main and/or auxiliary on-board electricity network;
  a speed sensor for sensing the speed of rotation of at least one of the engine(s) and/or the electrical machine(s), and/or the transmission; and
  a counter for counting the number of recharging and discharging cycles of at least one charge-delivery device of the main and/or auxiliary on-board electricity network, said cycle counter being associated with analyzer means for analyzing the lifetime of the charge-delivery device(s).

20. An aircraft according to claim 1, wherein the hybrid drive system includes at least one kinetic energy recovery system (KERS) that is mechanically or electrically connected to at least one auxiliary electrical machine for recovering a fraction of the kinetic energy generated when it decelerates, and electrically connected to the auxiliary electricity network so as to be capable of powering said auxiliary electrical machine in return, when necessary.

21. An aircraft according to claim 19, wherein in the event of a power plant being provided with a kinetic energy recovery system, a speed sensor is coupled to said system so as to determine its instantaneous speed of rotation, the speed sensor being incorporated in the measurement, analysis, and storage means.

22. A method of operating a rotary wing aircraft, the aircraft having:
- a main on-board electricity network;
- a power plant having at least one rotor for being driven in rotation, and at least one transmission for driving said rotor in rotation;
- the power plant being a hybrid power plant associating at least one main combustion engine with at least one hybrid drive auxiliary electrical machine;
- the main engine and the auxiliary electrical machine being mechanically coupled to the transmission;
- the auxiliary electrical machine being placed within the hybrid power plant to constitute in turn a member for mechanically driving the transmission or a member for generating electricity under the effect of being driven mechanically by said transmission;
- the on-board electricity network possessing at least one main electrical bus at a main nominal voltage;
- the main electrical bus having connected thereto at least one main device for delivering electric charge with at least one main storage battery, and a main electrical machine acting as a starter that is reversibly operable as a generator, said main electrical machine forming a starter being mechanically connected to said engine, the hybrid power plant including at least one hybrid drive system with at least one auxiliary electricity network for providing hybrid drive purposes, the auxiliary electricity network possessing a dedicated auxiliary electrical bus at an auxiliary nominal voltage, the auxiliary electrical machine being connected to the auxiliary electrical bus at the auxiliary nominal voltage;
- the main electrical bus and the hybrid drive auxiliary electrical bus being connected together via a selective adaptation interface in such a manner that the main on-board electricity network and the auxiliary electricity network are electrically distinct from one another, the selective adaption interface being configured to enable electrical energy to be exchanged selectively between the main and auxiliary electricity networks, the method comprising:
- in a stage of starting the engine, initiating said starting from the starter powered via the auxiliary electricity network, with this applying with an engine;
- in a flight stage, driving the transmission via said engine in a mode of self-sustained operation; and
- in a flight stage and in order to deliver extra mechanical energy occasionally to the transmission, driving the transmission from the auxiliary electrical machine operating as a motor and powered by at least one device for delivering electric charge of the main electricity network, in addition to the drive delivered to the transmission by the engine, for the purpose of performing specific flight controls and/or of taking the place of the drive delivered to the transmission by said engine in the event of the engine failing.

23. A method according to claim 22, wherein the method provides for powering the on-board electricity network from the auxiliary electricity network via the selective adaptation interface, where appropriate, in order to:
- stand in for a possible failure of at least one of the device for delivering charge of the main electricity network and/or a reversible electrical machine; and/or
- relieve the engine from driving the reversible electrical machine.

24. A method according to claim 22, wherein the method provides:
- in a stage of starting the engine, driving the transmission by an auxiliary electrical machine at a speed setting that is faster than that used when driving the engine by the electrical machine forming a reversible starter in order to decouple the engine from said transmission;
- allowing the engine to idle while the engine is in a mode of self-sustained operation; and
- coupling the engine with the transmission by docking by progressively accelerating the engine up to a speed corresponding to the speed at which the transmission is driven by said auxiliary electrical machine, via a freewheel or analogous means; said freewheel between the engine and the transmission enabling them to be decoupled.

25. A method according to claim 22, wherein the method provides that in a flight stage and on the ground mechanical energy is taken from the transmission by the auxiliary electric motor in order to brake said rotor that is connected to said transmission.

26. A method according to claim 22, wherein display means respond to the data delivered by the measurement, analysis, and storage means to produce information representative of a length of time remaining during which the hybrid drive electrical machine can be used at maximum power, said remaining length of time being taken into account on the basis of a state of instantaneous load on said electrical machine and of the first power that the machine is capable of delivering at the given instant.

* * * * *